United States Patent
Ryan et al.

(10) Patent No.: US 11,397,566 B2
(45) Date of Patent: Jul. 26, 2022

(54) FRAMEWORK FOR DEVELOPING AND DEPLOYING APPLICATIONS

(71) Applicant: Palantir Technologies Inc., Palo Alto, CA (US)

(72) Inventors: Alexander Ryan, Palo Alto, CA (US); Allen Chang, Sunnyvale, CA (US); William Bindi, Palo Alto, CA (US); Brian Lee, Sunnyvale, CA (US); John Carrino, Menlo Park, CA (US); Julie Tibshirani, Palo Alto, CA (US); Timothy Wilson, Palo Alto, CA (US)

(73) Assignee: Palantir Technologies Inc., Palo Alto, CA (US)

(*) Notice: Subject to any disclaimer, the term of this patent is extended or adjusted under 35 U.S.C. 154(b) by 0 days.

(21) Appl. No.: 17/000,256

(22) Filed: Aug. 21, 2020

(65) Prior Publication Data
US 2020/0387359 A1 Dec. 10, 2020

Related U.S. Application Data

(63) Continuation of application No. 16/213,936, filed on Dec. 7, 2018, now Pat. No. 10,754,627, which is a
(Continued)

(51) Int. Cl.
*G06F 9/44* (2018.01)
*G06F 11/36* (2006.01)
(Continued)

(52) U.S. Cl.
CPC .............. *G06F 8/36* (2013.01); *G06F 8/10* (2013.01); *G06F 8/34* (2013.01); *G06F 8/35* (2013.01);
(Continued)

(58) Field of Classification Search
CPC ...... G06F 8/36; G06F 8/10; G06F 8/34; G06F 8/35; G06F 8/20; G06F 16/95;
(Continued)

(56) References Cited

U.S. PATENT DOCUMENTS 5,418,950 A 5/1995 Li et al.
5,428,737 A 6/1995 Li et al.
(Continued)

FOREIGN PATENT DOCUMENTS

DE 102014103482 A1 9/2014
EP 1647908 A2 4/2006
(Continued)

OTHER PUBLICATIONS

Michael J. North et al., Complex adaptive systems modeling with Repast Simphony, 2013, [Retrieved on Jan. 31, 2022], Retrieved from the internet: <URL: https://link.springer.com/content/pdf/10.1186/2194-3206-1-3.pdf> 26 Pages (1-26) (Year: 2013).*
(Continued)

*Primary Examiner* — Anibal Rivera
(74) *Attorney, Agent, or Firm* — Sheppard Mullin Richter & Hampton LLP (57) ABSTRACT

A system may determine one or more data sources which the system is configured to access. The system may provide a set of application programming interfaces (APIs) for interacting with data stored in one or more data sources. The APIs may be accessible to one or more web applications which the system is configured to serve. The system may determine that a web application has requested an operation for interacting with the data through one or more APIs in the set of APIs. The system may determine one or more responses based at least in part on the operation requested by the web application. The system may provide the response(s) to the web application.

17 Claims, 7 Drawing Sheets

Related U.S. Application Data continuation of application No. 15/730,646, filed on Oct. 11, 2017, now Pat. No. 10,152,306.

(60) Provisional application No. 62/418,397, filed on Nov. 7, 2016.

(51) Int. Cl.

| | | |
|---|---|---|
| *G06F 8/36* | (2018.01) | |
| *G06F 16/2457* | (2019.01) | |
| *G06F 9/54* | (2006.01) | |
| *G06F 16/95* | (2019.01) | |
| *G06F 16/23* | (2019.01) | |
| *G06F 8/10* | (2018.01) | |
| *G06F 8/34* | (2018.01) | |
| *G06F 8/35* | (2018.01) | |
| G06F 16/335 | (2019.01) | |
| G06F 16/951 | (2019.01) | |
| G06F 16/9535 | (2019.01) | |
| G06F 9/445 | (2018.01) | |
| G06F 16/835 | (2019.01) | |
| G06F 8/30 | (2018.01) | |
| G06F 16/242 | (2019.01) | |
| G06F 16/25 | (2019.01) | |
| G06F 16/955 | (2019.01) | |
| G06F 8/20 | (2018.01) | |

(52) U.S. Cl.
CPC .............. *G06F 9/547* (2013.01); *G06F 16/23* (2019.01); *G06F 16/24575* (2019.01); *G06F 16/95* (2019.01); *G06F 8/20* (2013.01); *G06F 8/31* (2013.01); *G06F 9/44505* (2013.01); *G06F 9/44526* (2013.01); *G06F 9/541* (2013.01); *G06F 16/2425* (2019.01); *G06F 16/252* (2019.01); *G06F 16/335* (2019.01); *G06F 16/8365* (2019.01); *G06F 16/951* (2019.01); *G06F 16/9535* (2019.01); *G06F 16/9558* (2019.01)

(58) Field of Classification Search
CPC ............... G06F 16/23; G06F 16/24575; G06F 16/9535; G06F 16/335; G06F 16/951; G06F 9/547; G06F 9/44526; G06F 8/31; G06F 16/252; G06F 16/9558; G06F 16/2425; G06F 16/8365; G06F 16/8373; G06F 16/2455; G06F 16/258; G06F 9/541; G06F 9/44505; G06F 21/6218
See application file for complete search history.

(56) References Cited

U.S. PATENT DOCUMENTS

| | | | |
|---|---|---|---|
| 5,428,776 A | 6/1995 | Rothfield | |
| 5,542,089 A | 7/1996 | Lindsay et al. | |
| 5,608,899 A | 3/1997 | Li et al. | |
| 5,613,105 A | 3/1997 | Xbikowski et al. | |
| 5,701,456 A | 12/1997 | Jacopi et al. | |
| 5,724,575 A | 3/1998 | Hoover et al. | |
| 5,794,228 A | 8/1998 | French et al. | |
| 5,794,229 A | 8/1998 | French et al. | |
| 5,857,329 A | 1/1999 | Bingham | |
| 5,911,138 A | 6/1999 | Li et al. | |
| 5,918,225 A | 6/1999 | White et al. | |
| 6,141,759 A * | 10/2000 | Braddy ................ | G06F 9/5044 709/203 |
| 6,208,985 B1 | 3/2001 | Krehel | |
| 6,236,994 B1 | 5/2001 | Swartz et al. | |
| 6,289,334 B1 | 9/2001 | Reiner et al. | |
| 6,311,181 B1 | 10/2001 | Lee et al. | |
| 6,321,274 B1 | 11/2001 | Shakib et al. | |
| 6,434,619 B1 | 8/2002 | Lim | |
| 6,643,613 B2 | 11/2003 | McGee et al. | |
| 6,684,214 B2 | 1/2004 | Bata et al. | |
| 6,745,382 B1 | 6/2004 | Zothner | |
| 6,851,108 B1 | 2/2005 | Syme et al. | |
| 6,857,120 B1 | 2/2005 | Arnold et al. | |
| 6,877,137 B1 | 4/2005 | Rivette et al. | |
| 6,976,024 B1 | 12/2005 | Chavez et al. | |
| 6,980,984 B1 | 12/2005 | Huffman et al. | |
| 7,028,223 B1 | 4/2006 | Kolawa et al. | |
| 7,062,483 B2 | 6/2006 | Ferrari et al. | |
| 7,085,890 B2 | 8/2006 | Kashyap | |
| 7,099,888 B2 | 8/2006 | Gollapudi et al. | |
| 7,100,147 B2 | 8/2006 | Miller et al. | |
| 7,127,467 B2 | 10/2006 | Yalamanchi et al. | |
| 7,155,728 B1 | 12/2006 | Prabhu et al. | |
| 7,165,061 B2 | 1/2007 | K et al. | |
| 7,165,101 B2 | 1/2007 | Daniels et al. | |
| 7,216,133 B2 | 5/2007 | Wu et al. | |
| 7,243,093 B2 | 7/2007 | Cragun et al. | |
| 7,290,113 B2 | 10/2007 | Weinreb et al. | |
| 7,299,202 B2 | 11/2007 | Swanson | |
| 7,343,552 B2 | 3/2008 | Denoue et al. | |
| 7,366,723 B2 | 4/2008 | Shaburov | |
| 7,369,912 B2 | 5/2008 | Sherriff et al. | |
| 7,383,513 B2 | 6/2008 | Goldberg et al. | |
| 7,406,592 B1 | 7/2008 | Polyudov | |
| 7,409,676 B2 | 8/2008 | Agarwal et al. | |
| 7,483,028 B2 | 1/2009 | Wong et al. | |
| 7,490,100 B2 | 2/2009 | Dettinger et al. | |
| 7,512,738 B2 | 3/2009 | Balakrishnan et al. | |
| 7,519,589 B2 | 4/2009 | Charnock et al. | |
| 7,546,353 B2 | 6/2009 | Hesselink et al. | |
| 7,546,607 B2 | 6/2009 | Demsey et al. | |
| 7,571,192 B2 | 8/2009 | Gupta et al. | |
| 7,610,290 B2 | 10/2009 | Kruy et al. | |
| 7,620,648 B2 | 11/2009 | Cragun et al. | |
| 7,627,489 B2 | 12/2009 | Schaeffer et al. | |
| 7,657,540 B1 | 2/2010 | Bayliss | |
| 7,680,939 B2 | 3/2010 | Trevor et al. | |
| 7,689,624 B2 | 3/2010 | Huang et al. | |
| 7,761,525 B2 | 7/2010 | Moraes et al. | |
| 7,783,679 B2 | 8/2010 | Bley | |
| 7,801,912 B2 | 9/2010 | Ransil et al. | |
| 7,853,573 B2 | 12/2010 | Warner et al. | |
| 7,853,614 B2 | 12/2010 | Hoffman et al. | |
| 7,870,512 B2 | 1/2011 | Misovski | |
| 7,873,710 B2 | 1/2011 | Kiley et al. | |
| 7,877,367 B2 | 1/2011 | Ross et al. | |
| 7,877,421 B2 | 1/2011 | Berger et al. | |
| 7,899,796 B1 | 3/2011 | Borthwick et al. | |
| 7,900,052 B2 | 3/2011 | Jonas | |
| 7,908,286 B2 | 3/2011 | Krishnaprasad et al. | |
| 7,908,521 B2 | 3/2011 | Sridharan et al. | |
| 7,925,637 B2 | 4/2011 | Ma et al. | |
| 7,962,842 B2 | 6/2011 | Carro | |
| 7,979,424 B2 | 7/2011 | Dettinger et al. | |
| 8,020,110 B2 | 9/2011 | Hurst | |
| 8,055,672 B2 | 11/2011 | Djugash et al. | |
| 8,073,857 B2 | 12/2011 | Sreekanth | |
| 8,103,962 B2 | 1/2012 | Embley et al. | |
| 8,112,262 B2 | 2/2012 | Michelsen | |
| 8,122,008 B2 | 2/2012 | Li et al. | |
| 8,161,122 B2 | 4/2012 | Sood et al. | |
| 8,161,468 B2 | 4/2012 | Todd | |
| 8,244,895 B2 | 8/2012 | Mukherjee et al. | |
| 8,271,477 B2 | 9/2012 | Sood et al. | |
| 8,312,038 B2 | 11/2012 | Ceballos et al. | |
| 8,352,908 B2 | 1/2013 | Jhoney et al. | |
| 8,386,996 B2 | 2/2013 | Prigge et al. | |
| 8,417,715 B1 | 4/2013 | Bruckhaus et al. | |
| 8,429,194 B2 | 4/2013 | Aymeloglu et al. | |
| 8,433,702 B1 | 4/2013 | Carrino et al. | |
| 8,499,287 B2 | 7/2013 | Shafi et al. | |
| 8,547,349 B2 | 10/2013 | Lee et al. | |
| 8,560,494 B1 | 10/2013 | Downing | |
| 8,606,804 B2 | 12/2013 | Merz et al. | |
| 8,626,545 B2 | 1/2014 | Van Pelt et al. | |
| 8,626,770 B2 | 1/2014 | He et al. | |

(56) References Cited

U.S. PATENT DOCUMENTS

| | | | |
|---|---|---|---|
| 8,627,345 B2 | 1/2014 | Malik et al. | |
| 8,639,552 B1 | 1/2014 | Chen et al. | |
| 8,661,062 B1 | 2/2014 | Jamail et al. | |
| 8,719,252 B2 | 5/2014 | Miranker et al. | |
| 8,719,267 B2 | 5/2014 | Chen et al. | |
| 8,739,118 B2 | 5/2014 | Meek et al. | |
| 8,751,466 B1 | 6/2014 | Tsay | |
| 8,769,503 B2 | 7/2014 | Baker | |
| 8,775,608 B2 | 7/2014 | Westlake | |
| 8,799,867 B1 | 8/2014 | Peri-Glass et al. | |
| 8,805,861 B2 | 8/2014 | Boyan et al. | |
| 8,844,028 B1* | 9/2014 | Cheng | G06F 21/566 |
| | | | 726/22 |
| 8,909,597 B2 | 12/2014 | Aymeloglu et al. | |
| 8,924,429 B1 | 12/2014 | Fisher et al. | |
| 8,935,201 B1 | 1/2015 | Fisher et al. | |
| 8,954,553 B1 | 2/2015 | Colton | |
| 8,957,553 B2 | 2/2015 | Hasegawa | |
| 8,959,443 B2 | 2/2015 | Law | |
| 8,965,422 B2 | 2/2015 | Khan | |
| 8,966,486 B2 | 2/2015 | Phan et al. | |
| 8,976,955 B2 | 3/2015 | Liberman Ben-Ami | |
| 9,027,039 B2 | 5/2015 | Michels et al. | |
| 9,031,981 B1 | 5/2015 | Potter et al. | |
| 9,032,254 B2 | 5/2015 | Shochat et al. | |
| 9,098,315 B1* | 8/2015 | Kapoor | G06F 9/541 |
| 9,105,000 B1 | 8/2015 | White et al. | |
| 9,158,816 B2 | 10/2015 | Schindlauer et al. | |
| 9,245,049 B2 | 1/2016 | Fang | |
| 9,268,761 B2 | 2/2016 | Baldwin et al. | |
| 9,274,923 B2 | 3/2016 | Burton et al. | |
| 9,292,388 B2 | 3/2016 | Fisher et al. | |
| 9,330,120 B2 | 5/2016 | Colgrove et al. | |
| 9,336,184 B2 | 5/2016 | Mital et al. | |
| 9,348,677 B2 | 5/2016 | Marinelli, III et al. | |
| 9,348,920 B1 | 5/2016 | Kesin | |
| 9,378,526 B2 | 6/2016 | Sampson | |
| 9,390,178 B2 | 7/2016 | Laredo et al. | |
| 9,417,992 B2 | 8/2016 | Huang et al. | |
| 9,471,370 B2 | 10/2016 | Marinelli, III et al. | |
| 9,552,387 B2 | 1/2017 | Foebel et al. | |
| 9,576,006 B2 | 2/2017 | Boero et al. | |
| 9,600,823 B2 | 3/2017 | Lanciani et al. | |
| 9,710,512 B2 | 7/2017 | Foebel | |
| 9,727,314 B2 | 8/2017 | Michelsen | |
| 9,734,004 B2 | 8/2017 | Berg et al. | |
| 9,753,744 B1 | 9/2017 | Wells | |
| 9,767,127 B2 | 9/2017 | Feldschuh | |
| 9,792,194 B2 | 10/2017 | Faraj | |
| 9,798,768 B2 | 10/2017 | Potter et al. | |
| 9,805,407 B2 | 10/2017 | Shen et al. | |
| 9,842,000 B2 | 12/2017 | Bishop et al. | |
| 9,851,953 B2 | 12/2017 | Straub et al. | |
| 9,922,078 B2 | 3/2018 | Shiverick et al. | |
| 9,959,100 B2 | 5/2018 | Straub | |
| 9,996,807 B2 | 6/2018 | Miller et al. | |
| 10,002,159 B2 | 6/2018 | Kuriakose et al. | |
| 10,013,668 B2 | 7/2018 | Straub | |
| 10,067,978 B2* | 9/2018 | Park | G06Q 10/06 |
| 10,142,204 B2 | 11/2018 | Nickolov et al. | |
| 10,152,306 B2 | 12/2018 | Ryan et al. | |
| 10,264,016 B2 | 4/2019 | Walsh | |
| 10,324,773 B2 | 6/2019 | Wing et al. | |
| 10,419,514 B2 | 9/2019 | Straub et al. | |
| 10,437,635 B2 | 10/2019 | Layman et al. | |
| 10,452,497 B2 | 10/2019 | Straub et al. | |
| 10,582,001 B2 | 3/2020 | Straub | |
| 10,767,154 B2 | 9/2020 | Damren et al. | |
| 2003/0023620 A1 | 1/2003 | Trotta | |
| 2004/0088177 A1 | 5/2004 | Travis et al. | |
| 2004/0126840 A1 | 7/2004 | Cheng et al. | |
| 2004/0153837 A1 | 8/2004 | Preston et al. | |
| 2005/0021397 A1 | 1/2005 | Cui et al. | |
| 2005/0226473 A1 | 10/2005 | Ramesh | |
| 2006/0080616 A1 | 4/2006 | Vogel et al. | |
| 2006/0116991 A1 | 6/2006 | Calderwood | |
| 2006/0129992 A1 | 6/2006 | Oberholtzer et al. | |
| 2006/0142949 A1 | 6/2006 | Helt | |
| 2007/0005582 A1 | 1/2007 | Navratil | |
| 2007/0094248 A1 | 4/2007 | McVeigh et al. | |
| 2007/0113164 A1 | 5/2007 | Hansen et al. | |
| 2007/0130206 A1 | 6/2007 | Zhou et al. | |
| 2007/0178501 A1 | 8/2007 | Rabinowitz et al. | |
| 2007/0192281 A1 | 8/2007 | Cradick et al. | |
| 2007/0260582 A1 | 11/2007 | Liang | |
| 2008/0071796 A1* | 3/2008 | Ghuneim | G06F 16/9038 |
| 2008/0267386 A1 | 10/2008 | Cooper | |
| 2009/0006150 A1 | 1/2009 | Prigge et al. | |
| 2009/0083275 A1 | 3/2009 | Jacob et al. | |
| 2009/0094217 A1 | 4/2009 | Dettinger et al. | |
| 2009/0161147 A1 | 6/2009 | Klave | |
| 2009/0172674 A1 | 7/2009 | Bobak et al. | |
| 2009/0193012 A1 | 7/2009 | Williams | |
| 2009/0199047 A1 | 8/2009 | Vaitheeswaran et al. | |
| 2009/0282068 A1 | 11/2009 | Shockro et al. | |
| 2009/0299830 A1 | 12/2009 | West et al. | |
| 2010/0011282 A1 | 1/2010 | Dollard et al. | |
| 2010/0114887 A1 | 5/2010 | Conway et al. | |
| 2010/0169376 A1 | 7/2010 | Chu | |
| 2010/0169405 A1 | 7/2010 | Zhang | |
| 2010/0199167 A1 | 8/2010 | Uematsu et al. | |
| 2011/0041084 A1 | 2/2011 | Karam | |
| 2011/0066497 A1 | 3/2011 | Gopinath et al. | |
| 2011/0074811 A1 | 3/2011 | Hanson et al. | |
| 2011/0131547 A1 | 6/2011 | Elaasar | |
| 2011/0145689 A1 | 6/2011 | Campbell et al. | |
| 2011/0208822 A1 | 8/2011 | Rathod | |
| 2011/0258216 A1 | 10/2011 | Supakkul et al. | |
| 2012/0078595 A1 | 3/2012 | Balandin et al. | |
| 2012/0159449 A1 | 6/2012 | Arnold et al. | |
| 2012/0173381 A1 | 7/2012 | Smith | |
| 2012/0174057 A1 | 7/2012 | Narendra et al. | |
| 2013/0024268 A1 | 1/2013 | Manickavelu | |
| 2013/0054551 A1 | 2/2013 | Lange | |
| 2013/0086482 A1 | 4/2013 | Parsons | |
| 2013/0226944 A1 | 8/2013 | Baid et al. | |
| 2014/0244388 A1 | 8/2014 | Manouchehri et al. | |
| 2016/0026923 A1 | 1/2016 | Erenrich et al. | |
| 2016/0094670 A1 | 3/2016 | Garcia Manchado | |
| 2016/0098449 A1* | 4/2016 | Park | G06F 16/256 |
| | | | 707/718 |
| 2016/0112262 A1 | 4/2016 | Johnson | |
| 2016/0112394 A1* | 4/2016 | Sahu | H04L 63/102 |
| | | | 726/7 |
| 2016/0203138 A1 | 7/2016 | Feldschuh | |
| 2016/0203453 A1 | 7/2016 | Ito | |
| 2016/0285957 A1 | 9/2016 | Haserodt | |
| 2016/0359989 A1 | 12/2016 | Aycock | |
| 2017/0004506 A1 | 1/2017 | Steinman | |
| 2017/0048339 A1 | 2/2017 | Straub | |
| 2017/0091680 A1 | 3/2017 | Rosenthal | |
| 2017/0262852 A1 | 9/2017 | Florimond et al. | |
| 2017/0310605 A1* | 10/2017 | Garcia | H04L 47/822 |
| 2018/0144421 A1 | 5/2018 | Williams | |

FOREIGN PATENT DOCUMENTS

| | | |
|---|---|---|
| EP | 2634745 A1 | 9/2013 |
| EP | 2743839 A1 | 6/2014 |
| EP | 2778986 A1 | 9/2014 |
| EP | 2921975 A1 | 9/2015 |
| EP | 3037992 B1 | 10/2019 |
| GB | 2366498 A | 3/2002 |
| GB | 2508293 A | 5/2014 |
| GB | 2508503 A | 6/2014 |
| HK | 1194178 A | 9/2015 |
| NZ | 622485 A | 11/2014 |
| NZ | 616212 A | 1/2015 |
| NZ | 616299 A | 4/2015 |
| WO | 0034895 A1 | 6/2000 |

(56) References Cited

FOREIGN PATENT DOCUMENTS

WO          2010030917 A2     3/2010
WO          2013030595 A1     3/2013

OTHER PUBLICATIONS

"A Quick Guide to UniProtKB Swiss-Prot & TrEMBL," Sep. 2011, p. 2.
"A Tour of Pinboard," <http://pinboard.in/tour> as printed May 15, 2014 in 6 pages.
"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.h- tml.
"The FASTA Program Package," fasta-36.3.4, Mar. 25, 2011, pp. 29.
Alur et al., "Chapter 2: IBM InfoSphere DataStage Stages," IBM InfoSphere DataStage Data Flow and Job Design, Jul. 1, 2008, pp. 35-137.
Anonymous, "Frequently Asked Questions about Office Binder 97," http://web.archive.org/web/20100210112922/http://support.microsoft.com/kb- /843147 printed Dec. 18, 2006 in 5 pages.
Bae et al., "Partitioning Algorithms for the Computation of Average iceberg Queries," DaWaK200Q, LNCS 1874, pp. 276_286.
Ballesteros et al., "Batching: A Design Pattern for Efficient and Flexible Client/Server Interaction," Transactions on Pattern Languages of Programming, Springer Berlin Heildeberg, 2009, pp. 48-66.
Bogle et al., "Reducing Cross-Domain Call Overhead Using Batched Futures," SIGPLAN No. 29, 10 (Oct. 1994) pp. 341-354.
Bogle, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.
Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
Donjerkovic et al., "Probabilistic Optimization of Top N Queries," Proceedings of the 25th VLDB Conference, Edinburgh, Scotland, 1999, pp. 411-422.
Ettredge et al., Using web-based search data to predict macroeconomic statistics, 2005, [Retrieved on Jun. 27, 2018], Retrieved from the internet: <URL: https://dl.acm.org/citation.cfm?id=1096010> 6 pp. 87-92 (Year: 2005).
Extended European Search Report for EP Appln. No. EP19156063.0 dated Mar. 24, 2020, 15 pages.
Fang et al., "Computing Iceberg Queries Efficiently," Proceedings of the 24th VLDB Conference New York, 1998, pp. 299-310.
Frantisek et al., "An Architectural View of Distributed Objects and Components in CORBA, Java RMI and COM/DCOM," Software—Concepts & Tools, vol. 19, No. 1, Jun. 1, 1998, pp. 14-28.
Goldstein et al., "Stacks Lazy Threads: Implementing a Fast Parallel Call," Journal of Parallel and Distributed Computing, Jan. 1, 1996, pp. 5-20.
Han et al., "Efficient Computation of Iceberg Cubes with Complex Measures," ACM Sigmod, May 21-24, 2001, pp. 1-12.

Ivanova et al., "An Architecture for Recycling Intermediates in a Column-Store," Proceedings of the 35th Sigmod International Conference on Management of Data, Sigmod '09, Jun. 29, 2009, p. 309.
Jacques, "An extensible math expression parser with plug-ins," Code Project, Mar. 13, 2008. Retrieved on Jan. 30, 2015 from the internet: <http://www.codeproject.com/Articles/7335/An-extensible-math-expressio- n-parser-with-plug-ins>.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Kahan et al., "Annotea: An Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 5155.
Kitts, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, "Chapter 16: The BLAST Sequence Analysis Tool," The NCBI Handbook, Oct. 2002, pp. 1-15.
Melchiori, Hybrid Techniques for Web APIs Recommendation, Mar. 25, 2011, [Retrieved on Apr. 8, 2020], Retrieved from the internet: <URL: https://dl.acm.org/doi/pdf/10.1145/1966901.1966905?download=true> 7 pp. 17-23 (Year 2011).
Mendes et al., "TcruziKB: Enabling Complex Queries for Genomic Data Exploration," IEEE International Conference on Semantic Computing, Aug. 2008, pp. 432-439.
Michaux et al., An open-source platform for converged services, Oct. 15-17, 2013, [Retrieved on Apr. 8, 2020]. Retrieved from the internet:<URL: https://dl.acm.org/doi/pdf/10.1145/2589649.2554672?download=true> 8 pp. 1-8 (Year: 2013).
Mizrachi, "Chapter 1: GenBank: The Nuckeotide Sequence Database," The NCBI Handbook, Oct. 2002, pp. 1-14.
Notice of Allowance for U.S. Appl. No. 15/730,646 dated Aug, 7, 2018.
Official Communication for U.S. Appl. No. 15/730,646 dated Dec. 4, 2017.
Official Communication for U.S. Appl. No. 15/730,646 dated Mar. 1, 2018.
Russell et al., "NITELIGHT: A Graphical Tool for Semantic Query Construction," 2008, pp. 10.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW2008),EAcitrezza, Catania, Italy, Sep. E29-Oct. 3, 2008, p. 16.
Stamos et al., "Remote Evaluation," Journal ACM Transactions on Programming Languages and Systems (TOPLAS) vol. 12, Issue 4, Oct. 1990, pp. 537-564.
Wikipedia, "Machine Code", p. 1-5, printed Aug. 11, 2014.
Wollrath et al., "A Distributed Object Model for the Java System," Proceedings of the 2nd Conference on USENEX, Conference on Object-Oriented Technologies (COOTS), Jun. 17, 1996, pp. 219-231.
Ye et al., Design and Implementation of On-Line Hot Topic Discovery Model, 2006, [Retrieved on Jun. 27, 2018]. Retrieved from the internet: <URL: https://link.springer.com/content/pdf/10.1007%2FBF02831697.pdf> 6 pp. 21-26 (Year: 2006).

* cited by examiner

FRAMEWORK FOR DEVELOPING AND DEPLOYING APPLICATIONS

CROSS REFERENCE TO RELATED APPLICATIONS

This application is a continuation application of U.S. patent application Ser. No. 16/213,936, filed Dec. 7, 2018, now U.S. Pat. No. 10,754,627, which is a continuation application of U.S. patent application Ser. No. 15/730,646, filed Oct. 11, 2017, now U.S. Pat. No. 10,152,306, which claims the benefit under 35 U.S.C. § 119(e) of the U.S. Provisional Application Ser. No. 62/418,397, filed Nov. 7, 2016, the content of which is hereby incorporated by reference in its entirety.

FIELD OF DISCLOSURE

This disclosure relates to a framework for developing and deploying applications.

BACKGROUND

Under conventional approaches, a data analysis platform for analyzing various data may be deployed. The data may be obtained from many disparate data sources and, in some instances, the data may be ingested into one or more object-based data models that are supported by the data analysis platform. Users can interact with the data analysis platform using a workspace through which various operations, or workflows, for accessing and manipulating data may be utilized. In some instances, users may also need access to other types of operations and/or data sources that are not yet supported by the data analysis platform or whose integration with the data analysis platform is not feasible. In such instances, the users will typically need to develop a separate solution through which the other types of operations and/or data sources can be surfaced. Having to create and deploy such separate solutions that also easily integrate with the data analysis platform can be both challenging and inefficient.

SUMMARY

Various embodiments of the present disclosure can include systems, methods, and non-transitory computer readable media configured to determine a first data source which the system is configured to access; provide a set of application programming interfaces (APIs) for interacting with data stored in the first data source, the APIs being accessible to a first web application which the system is configured to serve; determine that the first web application has requested a first operation for interacting with the data through a first API in the set of APIs; determine one or more first responses based at least in part on the first operation requested by the first web application; and provide the one or more first responses to the first web application.

In some embodiments, the systems, methods, and non-transitory computer readable media are configured to determine that the first operation involves interacting with the first data source; provide information describing the first operation to the first data source for processing; and obtain the one or more first responses from the first data source.

In some embodiments, the systems, methods, and non-transitory computer readable media are configured to determine that the first operation involves interacting with the first data source; provide information describing the first operation to a data analysis platform for processing; and obtain the one or more first responses from the data analysis platform.

In some embodiments, the systems, methods, and non-transitory computer readable media are configured to cause the system to integrate with a data analysis platform through which a second data source is accessible, wherein the first data source is not accessible through the data analysis platform; provide information describing a second operation to the data analysis platform for processing using data stored in the second data source; and obtain one or more second responses from the data analysis platform.

In some embodiments, the systems, methods, and non-transitory computer readable media are configured to configure the system to serve a second web application, the second web application being deployed to process data stored in a second data source; and cause the system to integrate with the second data source, the system being configured to restrict access to the second data source to only the second web application.

In some embodiments, a server plugin provides a second set of APIs for interacting with the data stored in the first data source, the server plugin being deployed in a workspace running on a computing device; wherein the systems, methods, and non-transitory computer readable media are configured to process requests from the server plugin; determine that the server plugin has requested a second operation for interacting with the data through one or more of the set of APIs; determine one or more second responses based at least in part on the second operation requested by the server plugin; and provide the one or more second responses to the server plugin.

In some embodiments, the server plugin is configured to serve a second web application deployed in the workspace running on the computing device; and the server plugin provides the one or more second responses to the second web application.

In some embodiments, the second web application is deployed a Java workspace running on the computing device.

In some embodiments, the second web application is able to be deployed separately for execution through a web browser application.

In some embodiments, the first web application is running a web browser application.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

A claimed solution rooted in computer technology overcomes problems specifically arising in the realm of computer technology. In various implementations, a computing system is configured to provide a set of application programming interfaces (APIs) that allow users to interact with the data analysis platform. The computing system may also be configured to implement various modularized services through which operations for accessing and manipulating data can be performed. Such operations can allow for querying data as well as accessing and manipulating object graphs. The computing system may also be configured to implement various plugins that extend the functionality of the computing system. One example plugin can allow the computing system to access and ingest new data sources on which various operations will be performed. In one example, the computing system may be implemented as a web server. Users can develop web applications that can run on the web server and can utilize the various integrations that have been configured through the web server. In another example, a plugin (e.g., an embedded web server) that implements some, or all, of the features of the web server can be installed in a workspace client. In this example, any web applications that were developed can be executed on the stand-alone workspace client.

Figure 1:
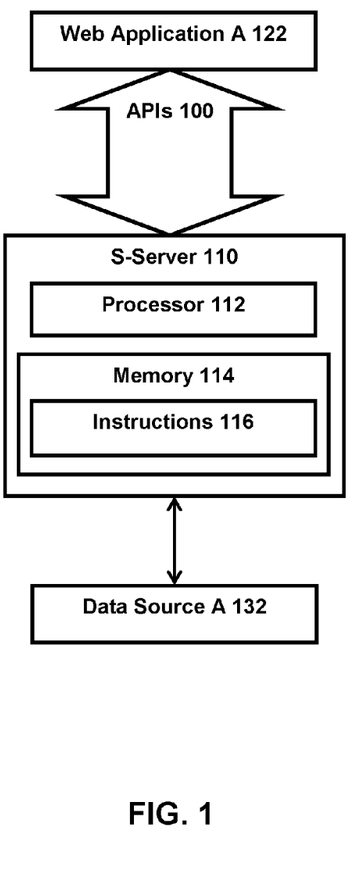
FIG. 1 illustrates an example block diagram of a web application, a server, and a data source, according to an embodiment of the present disclosure.

FIG. 1 illustrates an example block diagram of a web application A 122, an S-server 110, and a data source A 132. The S-server 110 may include a processor 112, memory 114, and/or other components. The processor 112 may provide information processing capabilities. The processor 112 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The memory 114 includes electronic storage medium that electronically stores information. The memory 114 may store software algorithms, information determined by processor 112, information received remotely, and/or other information needed for the S-server 110 to operate. The memory 114 may store instructions 116 and/or other information. The instructions 116, when executed by processor 112, can cause the S-server 110 to perform the various functions and/or operations disclosed herein.

In various embodiments, the S-server 110 provides a platform on which applications (e.g., web applications) can be developed and deployed. In some embodiments, the S-server 110 is configured to operate as a web server on which a set of application programming interfaces (APIs) 100 that provide various functionality are implemented. In one example, the web application A 122 may utilize the APIs 100 to request various operations to be performed on data (e.g., loading and storing data objects with properties and links, searching for data objects, tagging data objects, to name some examples). Such data may be stored in a data source (or data store) such as the data source A 132. In some embodiments, the data may be stored in other data sources that are not directly accessible to the S-server. For example, the data sources may be accessible through a separate data analysis platform. In such instances, the APIs 100 and/or a separate set of APIs implemented by the data analysis platform may be utilized to request operations to be performed on data stored in the other data sources, as described below.

The S-server 110 may be configured to serve the web application A 122. In one example, the S-server 110 may provide the web application A 122 with resources and/or access to data sources (e.g., the data source A 132), for example, for purposes of accessing, creating, and/or modifying data stored in the data source A 132. In general, an application (e.g., web application) may be a software application that runs on one or more computing systems (e.g., S-server 110, P-server, etc.). A web application may provide one or more frontend interfaces through which various operations may be performed. In general, web applications can be created using any generally known programming language including, for example, the Java programming language. In performing such operations, the web application may interact with one or more data sources (and/or data analysis platform) through a set of APIs provided by the one or more computing systems (e.g., S-server 110 and/or a P-server). In one example, the web application may be executed using various browser applications (e.g., web browsers). In another example, the same web applications may be configured to execute as applications in a Java workspace, as described below.

As mentioned, the S-server 110 provides the set of APIs 100 through which applications, e.g., the web application A 122, can request operations to be performed. In one example, the web application A 122 can utilize the APIs 100 to interact with data (e.g., access, create, and/or modify data) stored in the data source A 132. The APIs 100 may provide mechanisms by which web applications are able to communicate with other computing systems (e.g., the S-server 110, a P-server, a data analysis platform, and/or data sources). In some embodiments, the APIs 100 may include one or more sets of routines, protocols, and/or tools for building web applications. The APIs may also specify routines, protocols, and/or tools that define how a web application communicates with the computing systems. In various embodiments, the APIs may be modular and individually comprehensive packages for performing data operations, such as data read, data write, data search, data tag, data promotion, and/or other operations, to name some examples. In some embodiments, such data operations may be used on object graphs to perform, for example, object loads, searches, writes, organization, and publication. In various embodiments, the APIs 100 may include a set of Hypertext Transfer Protocol (HTTP)/JavaScript Object Notation (JSON) APIs that provide functionalities receiving and processing data operations over one or more networks. For example, APIs 100 may provide functionalities for loading, storing, editing, searching, and/or otherwise interacting with data. The APIs 100 can allow web applications to make API calls, which may specify one or more actions, one or more parameters, and/or one or more values for interacting with data. In some implementations, the S-server 110 can be configured so that a web application may communicate with other web applications using calls made through the APIs 100.

In various embodiments, the S-server 110 can be configured to access one or more data sources. In some embodiments, the S-server 110 can be configured to interact with data sources based on a configuration file that provides information needed to access the respective data sources. Such information can specify an address (e.g., network address, etc.) for connecting to the data source A 132, access credentials, type of data source (e.g., type of database), to name some examples. In some instances, a data source itself may be capable of performing operations. For example, the data source may provide data processing functionalities for data stored in the data source including, for example, creating objects, updating objects, searching for objects, aggregating objects, to name some examples. In such instances, the S-server 110 can be configured to leverage the capabilities of the data source when requesting operations to be performed. Some example data sources that can include various types of databases, CSV files, text files, to name some examples. In various embodiments, the data source, e.g., the data source A 132, may refer to an electronic storage and/or database that stores data for use by web applications, an S-server, a P-server, and/or a data analysis platform.

In the example of FIG. 1, the S-server 110 may determine that the web application A 122 has requested one or more operations for interacting with the data (e.g., accessing, creating, and/or modifying data) through one or more of the APIs 100. The S-server 110 can process the request(s) received from web application A 122 through one of more of the APIs 100 and determine whether the web application A 122 (and/or a user accessing the web application) has access to the requested data and/or access to perform the requested data operation(s). If the web application A 122 (or the user accessing the web application A 122) does not have access, the S-server 110 can provide a response to the web application A 122 indicating that the web application A 122 lacks access to perform the requested operation(s). However, if the web application A 122 has access, the S-server 110 can provide one or more responses to the requested operation(s). In some embodiments, the responses are generated and provided by the S-server 110. In some embodiments, the responses may be generated by the data source A 132 which is configured to process the requested operation(s), for example, based on the data stored in the data source A 132. For example, the operation may request a search of data stored in the data source A 132. In this example, the data source A 132 can be configured to perform the requested search operation and provide one or more responses to the search operation to be communicated to the web application A 122 through the S-server 110. In some embodiments, the response(s) may be provided as JavaScript Object Notation (JSON) objects.

Figure 2:
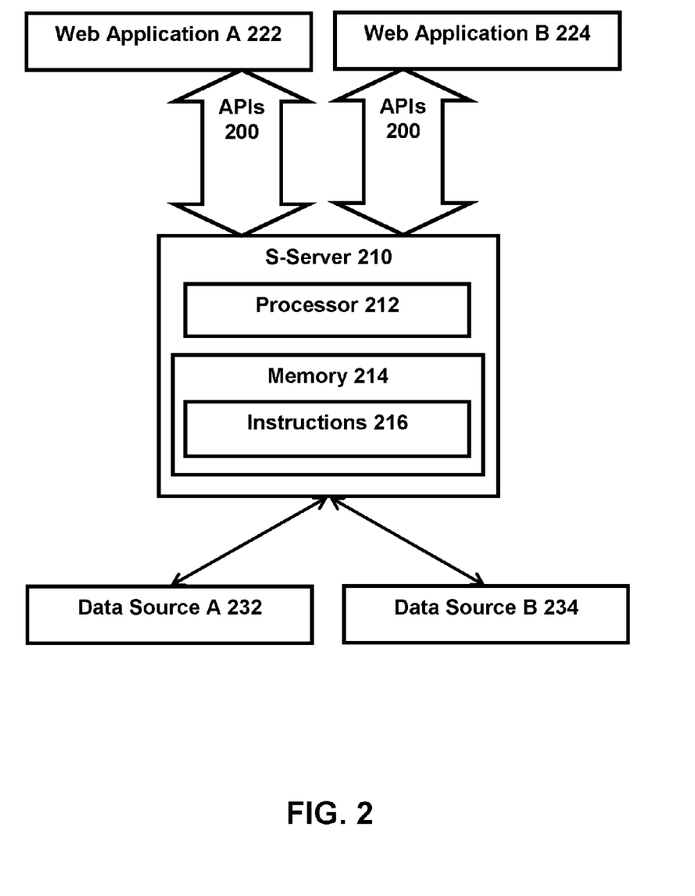
FIG. 2 illustrates an example block diagram of web applications, a server, and data sources, according to an embodiment of the present disclosure.

FIG. 2 illustrates an example block diagram of a web application A 222, a web application B 224, an S-server 210, a data source A 232, a data source B 234, and a set of APIs 200 that are provided by the S-server 210. The S-server 210 may include a processor 212, memory 214, instructions 216, and/or other components. In some embodiments, the S-server 210 can be configured to implement some, or all, of the functionalities of the S-server 110 as described above. Similarly, in some embodiments, the APIs 200 can be configured to implement some, or all, of the functionalities of the APIs 100 as described above.

In some implementations, the S-server 210 may be integrated with, e.g., configured to communicate and access, one or more data sources. For example, the S-server 210 may be configured to access the data source A 232 and the data source B 234. The S-server 210 may provide access to data stored in the data source A 232 and/or the data source B 234 to web applications through the set of APIs 200. In some embodiments, the S-server 210 can be configured to restrict access to the data sources. For example, the S-server 210 can be configured to restrict access to the data source A 232 to the web application A 222 and to restrict access to the data source B 234 to the web application B 224. Such access restrictions may be granular so that web applications can be restricted to perform one or more pre-defined operations on data stored in a given data source.

In various embodiments, the S-server 210 may be configured to run and serve both the web application A 222 and the web application B 224. For example, the S-server 210 may serve resources provided by the S-server 210, the data source A 232, and/or data source B 234. Assuming they have been granted the appropriate permissions, the web application A 222 and/or the web application B 224 can interact with the S-server 210 through the APIs 200 to access, create, and/or modify data that is stored in the data source A 232 and/or the data source B 234. For example, the S-server 210 may determine that the web application A 222 has requested to perform one or more write operations to the data stored in the data source A 232 through the APIs 200. The S-server 210 can process the request from the web application A 222 and determine the requested operations involved. As mentioned, in some embodiments, the operations may be performed by the respective data source on which the data is stored. In such embodiments, for example, if the web application A 222 requests one or more operations to be performed using data stored in the data source A 232, then the data source A 232 can perform the requested operations and provide responses to the S-server 210 and/or the web application A 222. These responses may include data requested by the web application A 222 and/or messages from the data source A 232 (e.g., error messages, status messages, etc.). In some embodiments, the operations may be performed by the S-server 210 by interacting with the respective data source on which the data is stored. For example, in such embodiments, if the web application A 222 requests one or more operations to be performed using data stored in the data source A 232, then the S-server 210 can interact with the data source A 232 to perform the requested operations and provide responses to the web application A 222.

Figure 3:
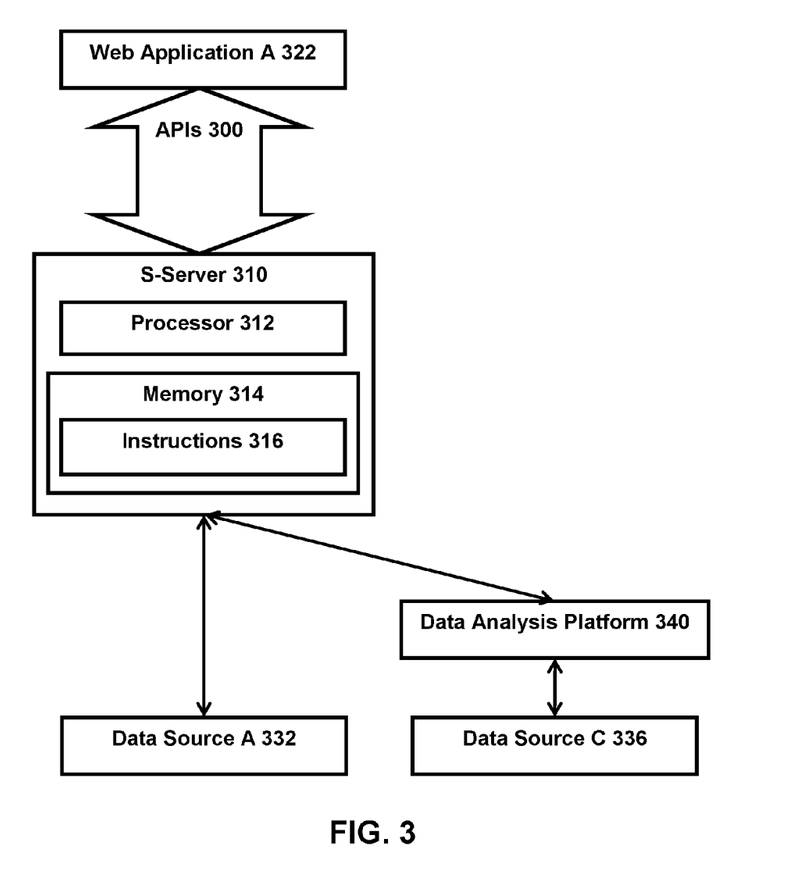
FIG. 3 illustrates an example block diagram of a web application, a server, a data analysis platform, and data sources, according to an embodiment of the present disclosure.

FIG. 3 illustrates an example block diagram of a web application A 322, an S-server 310, a data analysis platform 340, a data source A 332, and a data source C 336. The S-server 310 may include a processor 312, memory 314, instructions 316, and/or other components. In some embodiments, the S-server 310 can be configured to implement some, or all, of the functionalities of the S-server described above. Similarly, in some embodiments, the APIs 300 can be configured to implement some, or all, of the functionalities of the APIs described above. In the example of FIG. 3, the S-server 310 may be configured to access the data source A 332. Further, the S-server 310 can be configured to access the data source C 336 through the data analysis platform 340.

The S-server 310 may be configured to serve the web application A 322, for example, using resources from the S-server 310, the data analysis platform 340, the data source A 332, and/or the data source C 336. In various embodiments, the S-server 310 may implement APIs 300 that can be used by the web application A 322 for purposes of interacting with data stored in the data analysis platform 340, the data source A 332, and/or the data source C 336, for example. For example, the S-server 310 may determine that the web application A 322 has requested to perform one or more operations for interacting with the data (e.g., accessing, creating, and/or modifying data) through the APIs 300. In various embodiments, the S-server 310 may utilize the APIs 300 and/or other APIs to interact with the data source A 332 and/or the data analysis platform 340. In one example, the data analysis platform 340 may provide a separate set of APIs which are accessible to the S-server 310 for requesting operations to be performed by the data analysis platform 340 and/or data to be retrieved through the data analysis platform 340. In various embodiments, a data analysis platform, e.g., the data analysis platform 340, may refer to software and/or hardware that provides data processing functionalities to one or more servers and/or one or more web applications. In one example, the data analysis platform may provide functionalities for accessing, creating, processing, and/or modifying data (or data objects) stored in one or more data sources.

In some embodiments, the S-server 310 can delegate, or route, the requested operations to the appropriate data entity (e.g., the data source A 332, the data analysis platform 340, etc.) for processing the operations. The data entity can provide the S-server 310 with one or more responses that were determined based at least in part on the operation(s) requested by the web application A 322. For example, the web application A 322 may request an operation to search for various data in the data source A 332. In this example, the web application A 322 can interact with the data source A 332 using the APIs 300 provided by the S-server 310. The data source A 332 can perform the requested operation and provide one or more responses to the web application A 322. For example, the data source A 332 can provide a response (e.g., a JSON object) with information responsive to the requested search operation to the S-server 310, which then forwards the response to the web application A 322. In another example, the web application A 322 may request an operation to update (or modify) data stored in the data source C 336. In this example, the web application A 322 can interact with the data source C 336 through the data analysis platform 340 using the APIs 300 provided by the S-server 310. The data analysis platform 340 and/or the data source C 336 can perform the requested operation and provide one or more responses to the web application A 322. For example, the data source C 336 can provide a response (e.g., a JSON object) to the data analysis platform 340 with information responsive to the requested update operation. In this example, the data analysis platform 340 can send the response to the S-server 310 which then sends the response to the web application A 322.

In some embodiments, the S-server 310 may convert data stored in one or more data sources to a native format that is recognized by the data analysis platform 340. For example, the data in the data source A 332 may be stored in a legacy system. The operation of the legacy system may be slow and/or the legacy system may not allow for certain operations on the data stored in data source A 332. In this example, a user accessing the web application A 322 may request to perform operations that can be performed by the data analysis platform 340 but that are not supported the by data source A 332. In such instances, converting the legacy system to a format recognized by the data analysis platform 340 may be slow and/or require vast amounts of processing/ storage resources. Instead, the S-server 310 may be configured to selectively promote data stored in the data source A 332. That is, rather than converting all of the data stored in the data source A 332, the S-server 310 may "promote" the data required for the operation. In some embodiments, promoting data may include selecting the relevant data in the data source A 332 and converting the relevant data to a format that is recognized by the data analysis platform 340. Promotion of data may be performed in real-time. For example, in response to a request for an operation on a particular data in data source A 332, the S-server 310 may convert the particular data so that the data is accessible by the data analysis platform 340. The converted data may be stored in the S-server 310, the data analysis platform 340, and/or other electronic storage accessible to the data analysis platform 340 (e.g., data source C 336). When a subsequent operation on the particular data in the data source A 332 is requested, the data analysis platform 340 may use the converted data to perform the operation. Promotion of the data may enable users accessing web applications to make use of the data without having to fully integrate the S-server 310 with the legacy server.

Figure 4:
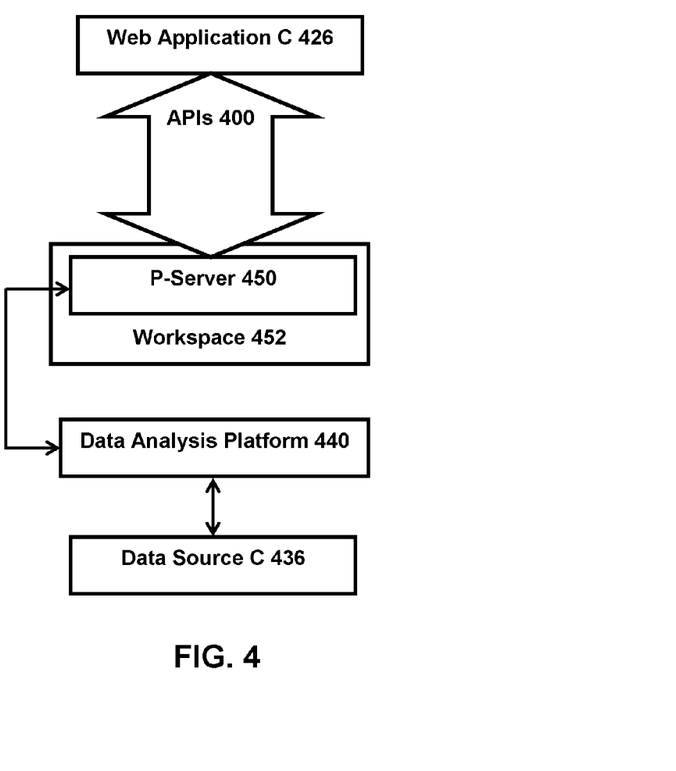
FIG. 4 illustrates an example block diagram of a web application, a plugin-server, a data analysis platform, and a data source, according to an embodiment of the present disclosure.

FIG. 4 illustrates an example block diagram of a web application C 426, a P-server 450, a data analysis platform 440, and a data source C 436. In some embodiments, the P-server 450 may be a software application plugin that is implemented within a workspace 452 (e.g., a Java workspace) running on a computing system. In such embodiments, the P-server 450 can be configured to operate as a web server embedded in the workspace 452. In various embodiments, the P-server 450 may be configured to provide some, or all, of the functionalities that are provided by an S-server as described above.

The P-server 450 may implement a set of APIs 400 that are configured to implement some, or all, of the functionalities of the APIs described above. As a result, the P-server 450 can provide the workspace 452 with the functionalities of the S-server without requiring a separate web server to be deployed. In some embodiments, implementation of the same APIs by an S-server and the P-server 450 allows web applications to run on an S-server and/or the P-server 450 while using the same APIs. Thus, using the same APIs allows frontend applications (e.g., web applications) to be developed agnostic of whether the frontend applications will be deployed on top of an S-server (e.g., web server), P-server (e.g., within a workspace), and/or future back-end systems. In various embodiments, the P-server 450 may utilize the APIs 400 and/or other APIs to interact with the data analysis platform 440. In one example, the data analysis platform 440 may provide a separate set of APIs which are accessible to the P-server 450 for requesting operations to be performed by the data analysis platform 440 and/or data to be retrieved through the data analysis platform 440.

For example, the P-server 450 may determine that the web application C 426 has requested one or more operations for interacting with the data (e.g., accessing, creating, and/or modifying data) through one or more of the APIs 400. The P-server 450 can process the request(s) from the web application C 426 and determine the requested operations involved. As mentioned, in some embodiments, the operations may be performed by the respective data source on which the data is stored. For example, in such embodiments, if the web application C 426 requests one or more operations to be performed using data stored in the data source C 436, then the data analysis platform 440 and/or the data source C 436 can perform the requested operations and provide responses to the P-server 450, for example, through the data analysis platform 440. In some embodiments, the operations may be performed by the P-server 450 by interacting with the respective data source on which the data is stored. For example, in such embodiments, if the web application C 426 requests one or more operations to be performed using data stored in the data source C 436, then the P-server 450 can interact with the data source C 436 directly to perform the requested operations and provide responses to the web application C 426.

Figure 5:
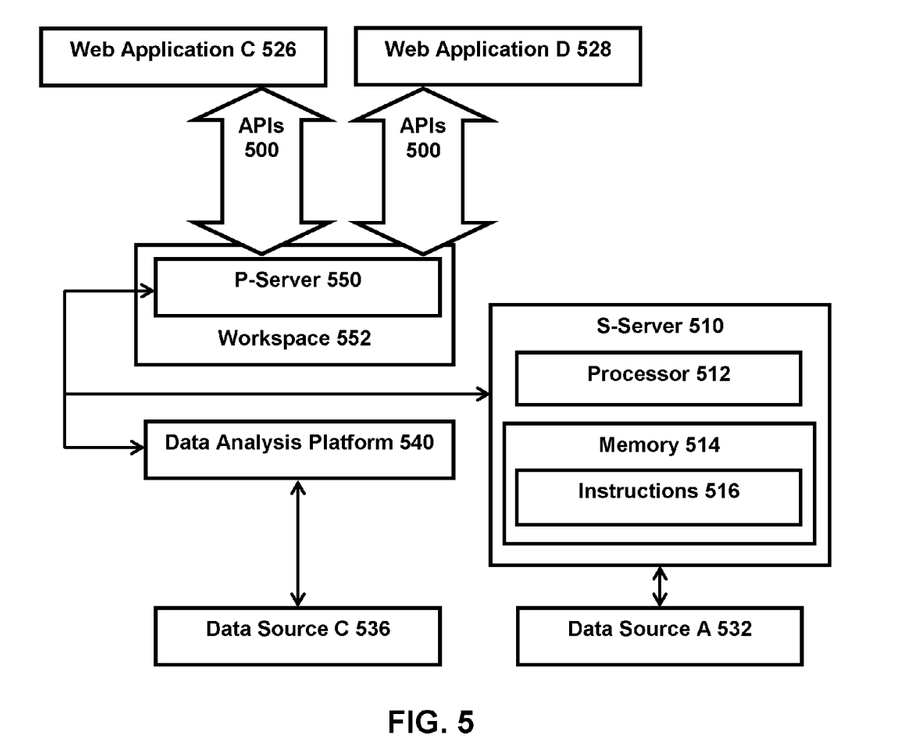
FIG. 5 illustrates an example block diagram of web applications, a plugin-server, a server, a data analysis platform, and data sources, according to an embodiment of the present disclosure.

FIG. 5 illustrates an example block diagram of a web application C 526, a web application D 528, an S-server 510, a P-server 550, a data analysis platform 540, a data source A 532, and a data source C 536. The S-server 510 may include a processor 512, memory 514, instructions 516, and/or other components. In various embodiments, the S-server 510 may be configured to provide some, or all, of the functionalities that are provided by an S-server as described above. In various embodiments, the P-server 550 may be configured to provide some, or all, of the functionalities that are provided by a P-server as described above. In some embodiments, the P-server 550 may implement a set of APIs 500 that are configured to implement some, or all, of the functionalities of the APIs described above.

In the example of FIG. 5, the P-server 550 may be configured to serve the web application C 526 and the web application D 528. In various embodiments, the P-server 550 may provide access to resources from the P-server 550, the workspace 552, the data analysis platform 540, and/or the data source C 536. Such resources may be provided to the web application C 526 and/or the web application D 528 for processing (e.g., accessing, creating, and/or modifying) data stored in the workspace 552, the data analysis platform 540, and/or data source C 536, for example. Moreover, the P-server 550 may be configured to interact with the S-server 510 to provide web applications 526, 528 with access to data stored in the data source A 532.

In various embodiments, the P-server 550 provides a set of APIs 500 through which the web application C 526 and/or web application D 528 can request one or more operations for interacting with various data (e.g., accessing, creating, and/or modifying data). For example, the web application C 526 can use the APIs 500 to request operations to be performed on data stored in the data source C 536. In this example, the data source C 536 can perform the operations and provide responses to be delivered to the web application C 526. In some embodiments, web applications can request operations to be performed by the data analysis platform 540 on various data. For example, the P-server 550 can interact with the data analysis platform 540 to have the data analysis platform 540 perform the requested operations. As mentioned, in some embodiments, the data analysis platform 540 may provide a separate set of APIs which are accessible to the P-server 550 for requesting operations to be performed by the data analysis platform 540 and/or data to be retrieved through the data analysis platform 540. Similarly, in some embodiments, the S-server 510 may provide a separate set of APIs which are accessible to the P-server 550 for requesting operations to be performed by the S-server 510 and/or data to be retrieved through the S-server 510. When processing web application requests, the P-server 550 can be configured to determine whether the requesting web application has been granted the appropriate level of permissions for performing the requested operations.

As described above, the P-server 550 may determine one or more responses based at least in part on the operation(s) requested by web application C 526 and/or web application D 528. In some embodiments, one or more response(s) may be determined by the P-server 550. In some embodiments, the P-server 550 may receive one or more of the responses from data source C 536 and/or data analysis platform 540. The P-server 550 can then provide the response(s) to the web application that requested the operations.

In some embodiments, the P-server 550 may delegate data retrieval functionalities to S-server 510. For example, the P-server 550 may want to access data stored in the data source A 532. In this example, the S-server 510 may receive the data retrieval request from P-server 550, retrieve the requested data from data source A 532, and provide the data to P-server 550. The P-server 550 can then provide the requested data to web application D 528. In some embodiments, the P-server 550 may delegate data operation functionalities to the S-server 510. The S-server 510 may receive the data operation request from P-server 550, retrieve the data from data source A 532, perform the operation to the data, generate the responses, and provide the responses to the P-server 550. In some implementations, the S-server 510 may provide information describing the requested data operations to the data source A 532 and the data source A 532 may perform the requested operations.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others. Firmware, software, routines, or instructions may be described herein in terms of specific exemplary aspects and implementations of the disclosure, and performing certain actions.

Any communication medium may be used to facilitate interaction between any components of the disclosure. One or more components shown in FIGS. 1-6 may communicate with each other through hard-wired communication, wireless communication, or both. By way of non-limiting example, wireless communication may include one or more of radio communication, Bluetooth communication, Wi-Fi communication, cellular communication, infrared communication, or other wireless communication. Other types of communications are contemplated by the present disclosure.

Figure 6:
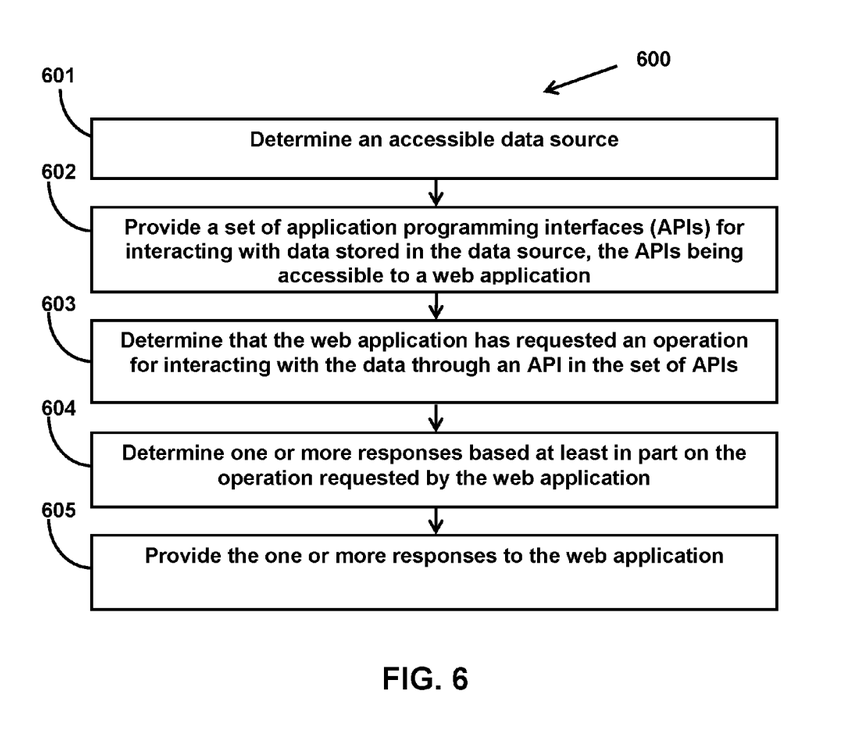
FIG. 6 illustrates an example method for serving web applications, according to an embodiment of the present disclosure.

FIG. 6 illustrates an example method 600 for serving applications (e.g., web applications) in accordance with the current disclosure. The operations of method 600 presented below are intended to be illustrative. Depending on the implementation, the example method 600 may include additional, fewer, or alternative steps performed in various orders or in parallel. The example method 600 may be implemented in various computing systems or devices including one or more processors.

At block 601, a data source that is accessible may be determined. The data source may be the same as or similar to data sources (e.g., 132, 232, 234, 332, 336, 436, 532, 536) described herein. The data source may be accessible to a component the same as or similar to S-server (e.g., 110, 210, 310, 510) described herein. In some implementation, operation 201 may be performed by a component the same as or similar to S-server (e.g., 110, 210, 310, 510) described herein.

At block 602, a set of application programming interfaces (APIs) for interacting with data stored in the data source may be provided. The APIs may be accessible to a web application. The web application may be the same as or similar to web applications (e.g., 122, 222, 224, 322, 426, 526, 528) described herein. In some implementation, operation 602 may be performed by a component the same as or similar to S-server (e.g., 110, 210, 310, 510) described herein.

At block 603, an operation for interacting with the data may be determined. The operation may have been requested by the web application through an API in the set of APIs. In some implementation, operation 603 may be performed by a component the same as or similar to S-server (e.g., 110, 210, 310, 510) described herein.

At block 604, one or more responses may be determined at least in part on the operation requested by the web application. In some implementation, operation 604 may be performed by a component the same as or similar to S-server (e.g., 110, 210, 310, 510) described herein.

At block 605, one or more responses may be provided to the web application. In some implementation, operation 605 may be performed by a component the same as or similar to S-server (e.g., 110, 210, 310, 510) described herein.

Hardware Implementation

Figure 7:
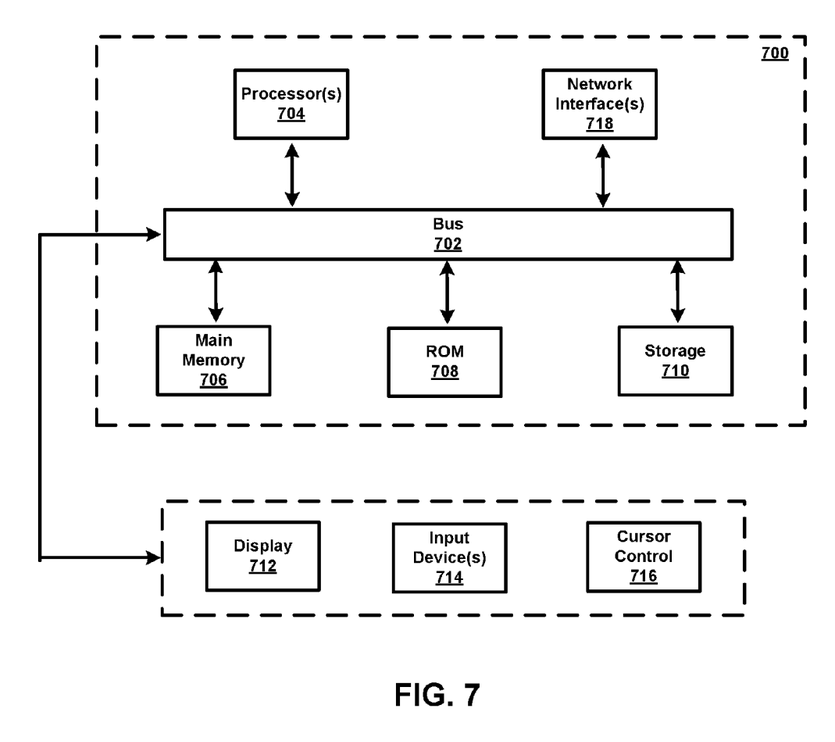
FIG. 7 illustrates a diagrammatic representation of an embodiment of a computer system, within which a set of instructions for causing the computer system to perform one or more of the embodiments described herein can be executed, according to an embodiment of the present disclosure.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A client computing device, comprising:
one or more hardware processors;
a memory storing instructions to be executed by the one or more hardware processors;
a plugin comprising a first set of one or more application programming interfaces (APIs) that enables one or more applications to interact with one or more data sources, and wherein, responsive to execution by the one or more hardware processors, the plugin is configured to:
receive, from a first application or a second application of the one or more applications, a first request to perform one or more first operations on a first subset of first data stored at a first data source of the one or more data sources;
interact with the first data source directly or via a data analysis platform to obtain a response to the first request from the first application or the second application;
receive, from the first application or the second application, a second request to perform one or more second operations on a second subset of second data stored at a second data source of the one or more data sources;
determine whether the one or more second operations are supported by the second data source;
in response to determining that the one or more second operations are unsupported by the second data source, delegate the one or more second operations to the data analysis platform and determine that a first format of the second data stored at the second data source is unrecognizable by the data analysis platform;
in response to determining that the first format of the second subset of the second data is unrecognizable by the data analysis platform, selectively convert the second subset of the second data to a second format recognizable by the data analysis platform based on a speed of a conversion of the second data or amounts of processing or storage resources consumed by the conversion, while refraining from converting a remainder of the second data besides the second subset of the second data; and
store the converted second subset of the second data in the data analysis platform.

2. The client computing device of claim 1, wherein the first request to interact with the first data stored at the first data source is associated with performing a first operation using the first data stored at the first data source.

3. The client computing device of claim 2, wherein, responsive to execution by the one or more hardware processors, the plugin is further configured to:
determine that the first application or the second application is associated with an appropriate permission level for performing the first operation using the first data stored at the first data source.

4. The client computing device of claim 2, wherein the plugin is configured to perform the first operation by interacting with the first data source.

5. The client computing device of claim 2, wherein the data analysis platform is configured to perform the first operation by interacting with the first data source.

6. The client computing device of claim 2, wherein, responsive to execution by the one or more hardware processors, the plugin is further configured to:
send the first request to the first data source such that the first operation is performed by the first data source;
receive the response to the first request from the first data source; and provide the response to the first application or the second application.

7. The client computing device of claim 6, wherein the plugin receives the response from the first data source via the data analysis platform.

8. The client computing device of claim 1, wherein the plugin is configured to operate as an embedded web server in a workspace environment.

9. A computer-implemented method, comprising:
providing, by a plugin deployed in a workspace environment, a set of one or more application programming interfaces (APIs) that enables one or more applications to interact with one or more data sources;
receiving, by the plugin from a first application or a second application of the one or more applications, a first request to perform one or more first operations on a first subset of first data stored at a first data source of the one or more data sources;
interacting, by the plugin, with the first data source directly or via a data analysis platform to obtain a response to the first request from the first application or the second application;
receiving, from the first application or the second application, a second request to perform one or more second operations on a second subset of second data stored at a second data source of the one or more data sources;
determining whether the one or more second operations are supported by the second data source;
in response to determining that the one or more second operations are unsupported by the second data source, delegating the one or more second operations to the data analysis platform and determining that a first format of the second data stored at the second data source is unrecognizable by the data analysis platform;
in response to determining that the first format of the second subset of the second data is unrecognizable by the data analysis platform, selectively converting the second subset of the second data to a second format recognizable by the data analysis platform based on a speed of a conversion of the second data or amounts of processing or storage resources consumed by the conversion, while refraining from converting a remainder of the second data besides the second subset of the second data; and
storing the converted second subset of the second data in the data analysis platform.

10. The computer-implemented method of claim 9, wherein the first request to interact with the first data stored at the first data source is associated with performing a first operation using the first data stored at the first data source.

11. The computer-implemented method of claim 10, further comprising:
determining, by the plugin, that the first application or the second application is associated with an appropriate permission level for performing the first operation using the first data stored at the first data source.

12. The computer-implemented method of claim 10, performing, by the plugin, the first operation by interacting with the first data source.

13. The computer-implemented method of claim 10, wherein the data analysis platform is configured to perform the first operation by interacting with the first data source.

14. The computer-implemented method of claim 10, further comprising:
sending, by the plugin, the first request to the first data source such that the first operation is performed by the first data source;
receiving, by the plugin, the response to the first request from the first data source; and
providing, by the plugin, the response to the first application or the second application.

15. The computer-implemented method of claim 14, wherein receiving the response comprises receiving, by the plugin, the response from the first data source via the data analysis platform.

16. The computer-implemented method of claim 9, wherein the plugin is configured to operate as an embedded web server in the workspace environment.

17. A non-transitory computer readable medium comprising instructions that, when executed, cause one or more processors to perform:
providing, by a plugin deployed in a workspace environment, a set of one or more application programming interfaces (APIs) that enables one or more applications to interact with one or more data sources;
receiving, by the plugin from a first application or a second application of the one or more applications, a first request to perform one or more first operations on a first subset of first data stored at a first data source of the one or more data sources;
interacting, by the plugin, with the first data source directly or via a data analysis platform to obtain a response to the first request from the first application or the second application;
receiving, from the first application or the second application, a second request to perform one or more second operations on a second subset of second data stored at a second data source of the one or more data sources;
determining whether the one or more second operations are supported by the second data source;
in response to determining that the one or more second operations are unsupported by the second data source, delegating the one or more second operations to the data analysis platform and determining that a first format of the second data stored at the second data source is unrecognizable by the data analysis platform;
in response to determining that the first format of the second subset of the second data is unrecognizable by the data analysis platform, selectively converting the second subset of the second data to a second format recognizable by the data analysis platform based on a speed of a conversion of the second data or amounts of processing or storage resources consumed by the conversion, while refraining from converting a remainder of the second data besides the second subset of the second data; and
store the converted second subset of the second data in the data analysis platform.

\* \* \* \* \*